United States Patent
Takahashi et al.

(10) Patent No.: US 6,424,904 B1
(45) Date of Patent: Jul. 23, 2002

(54) CURVE APPROACHING MODE CONTROLLER

(75) Inventors: Akira Takahashi; Munenori Matsuura, both of Mitaka (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 75 days.

(21) Appl. No.: 09/664,736

(22) Filed: Sep. 19, 2000

(30) Foreign Application Priority Data

Sep. 22, 1999 (JP) .......................................... 11-269549

(51) Int. Cl.[7] .............................................. G01C 21/00
(52) U.S. Cl. ............................ 701/70; 701/93; 340/441
(58) Field of Search ............................ 701/70, 72, 45, 701/207, 93; 340/438, 441

(56) References Cited

U.S. PATENT DOCUMENTS

| | | | | |
|---|---|---|---|---|
| 5,315,295 A | * | 5/1994 | Fujii | 340/936 |
| 5,742,240 A | * | 4/1998 | Asanuma et al. | 340/995 |
| 5,748,476 A | * | 5/1998 | Sekine et al. | 364/449 |
| 5,978,731 A | * | 11/1999 | Matsuda | 701/208 |
| 6,070,121 A | * | 5/2000 | Matsuda | 701/205 |

FOREIGN PATENT DOCUMENTS

| JP | 4-236699 | 8/1992 |
|---|---|---|
| JP | 8-002274 | 1/1996 |
| JP | 11-083501 | 3/1999 |

* cited by examiner

Primary Examiner—Michael J. Zanelli
(74) Attorney, Agent, or Firm—Smith, Gambrell & Russell, LLP

(57) ABSTRACT

A curve approaching mode controller is capable of continuing vehicle control operations for the longest possible time even if curve information is not available from a navigation system. The navigation system provides curve information about a curve on a road stretching ahead of a vehicle. A control unit estimates a curve approaching mode in which the vehicle will approach the curve on the basis of the curve information and, when necessary, gives a warning and executes a decelerating control operation. If only insufficient curve information is available from the navigation system, a road attribute calculating and storing unit stores the normal node information received immediately before receiving the insufficient node information (curve information) without updating the same, and informs a warning speed calculating and storing unit of a fact that the node information is insufficient. A warning speed calculating and storing unit calculates a warning speed that serves as a reference for warning on the basis of the normal node information received immediately before receiving the insufficient node information, taking a distance traveled by the vehicle after the insufficient node information has been received.

12 Claims, 4 Drawing Sheets

| START | NUMBER OF NODES (n) | EAST LONGITUDE | NORTH LATITUDE | END |
|---|---|---|---|---|
FIG.3
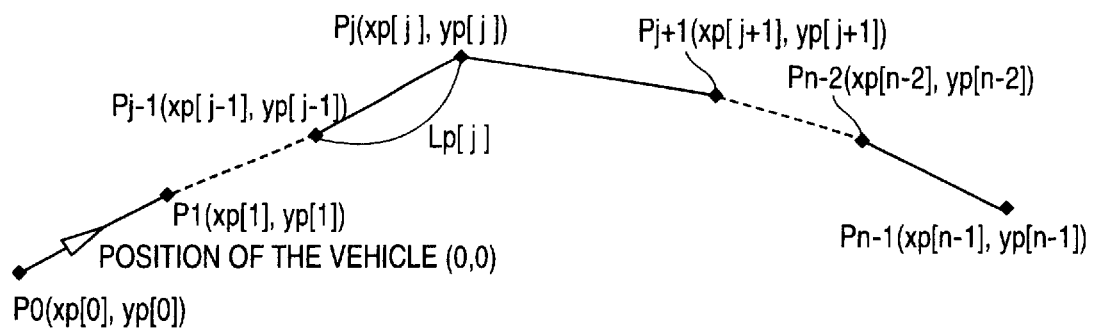
FIG.4
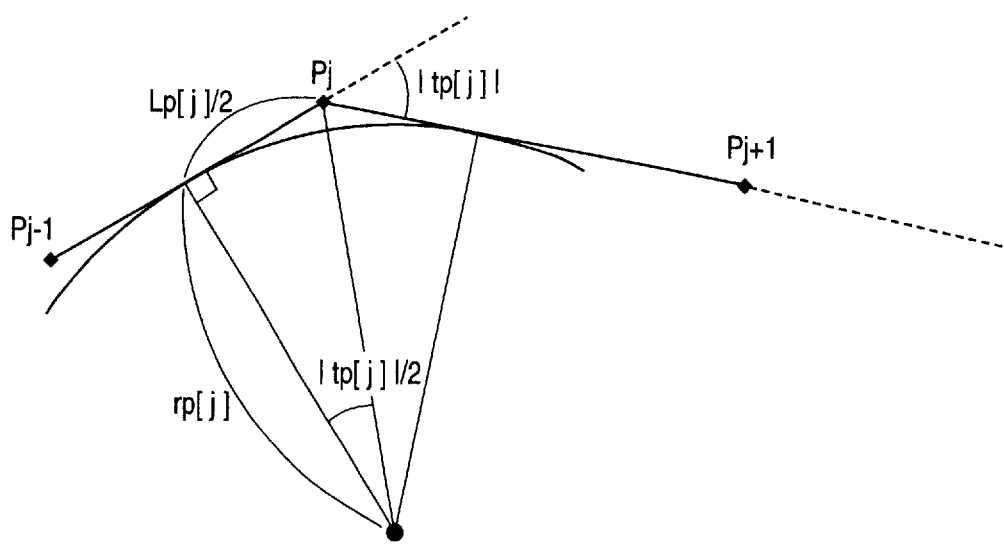
FIG.5

CURVE APPROACHING MODE CONTROLLER

BACKGROUND OF THE INVENTION

1. Field of the Invention

The present invention relates to a controller for controlling the running mode of a vehicle and, more particularly, to a curve approaching mode controller that estimates a running mode in which a vehicle will approach a curve in a road stretching ahead of the vehicle on the basis of information about the curve provided by a navigation system or the like, gives a warning to the driver and, when necessary, controls the vehicle for deceleration.

2. Description of the Related Art

There have been proposed various curve approaching mode controllers that determines an appropriate curve approaching speed for running a curve in a road stretching ahead of a vehicle on the basis of road map data stored in a navigation system and, if the actual running speed of the vehicle is higher than the appropriate curve approaching speed, gives a warning to the driver or executes a control operation to decelerate the vehicle.

A curve approaching mode controller disclosed in JP-A No. 4-236699 calculates an appropriate approach speed at which a vehicle is able to enter safely a curve in a road stretching ahead of the vehicle and having road characteristics including a radius of curvature on the basis of information about the curve in the road provided by a navigation system, gives a warning and instructs the driver to reduce the running speed of the vehicle or reduces the running speed of the vehicle automatically if the actual running speed of the vehicle is higher than the appropriate approach speed.

This prior art curve approaching mode controller is able to control the curve approaching mode of the vehicle only when the information about the curve in the road stretching ahead of the vehicle is available from the navigation system. Therefore, the curve approaching mode controller stops warning the driver and controlling the vehicle for deceleration when the information about the curve in the road is unavailable from the navigation system. For example, when a road is under construction and the vehicle is compelled to take a detour or when the vehicle short-cuts a road, the navigation system is unable to find the position of the vehicle in the road map data stored therein, is unable to provide data on the road stretching ahead of the vehicle and, consequently, there is the possibility that the curve approaching mode controller stops control operations for warning the driver and decelerating the vehicle. It is possible that the position of a vehicle goes out of road map data stored in the navigation system while the vehicle is running in the vicinity of a curve in a road or a crossing due to errors in the road map data or errors in the absolute position of the vehicle indicated by the GPS (global positioning system). In such a case, the navigation system is unable to provide road data on the road stretching ahead of the vehicle and, consequently, the curve approaching mode controller stops control operations for warning the driver and decelerating the vehicle.

SUMMARY OF THE INVENTION

The present invention has been made in view of the foregoing problems and it is therefore an object of the present invention to provide a curve approaching mode controller capable of continuing control operations for controlling the running of a vehicle to some extent even if any information about a curve in a road stretching ahead of a vehicle is unavailable from the navigation system, capable of instructing the driver of a vehicle according to natural conditions and capable of being easily used.

According to the present invention, a curve approaching mode controller includes: a curve information retrieving unit for retrieving curve information about a curve in a road stretching ahead of a vehicle; and a control unit for estimating a curve approaching mode in which the vehicle will approach the curve on the basis of the curve information retrieved by the curve information retrieving unit and executing predetermined control operations; wherein the control unit estimates, when the curve information retrieved by the curve information retrieving unit is insufficient for curve approaching mode estimation, a curve approaching mode in which the vehicle will approaches the curve on the basis of curve information provided before the curve information becomes insufficient.

Preferably, the control unit completes a curve approaching mode estimating operation in a predetermined time period when the curve information is insufficient. Also, it is preferred that the control unit completes a curve approaching mode estimating operation while the vehicle travels a predetermined distance when the curve information is insufficient.

According to the present invention, the curve information retrieving unit retrieves the curve information about a curve in a road stretching ahead of the vehicle, and the control unit estimates a curve approaching mode in which the vehicle will approach the curve on the basis of the curve information and executes control operations. If the estimation of a curve approaching mode in which the vehicle will approach the curve is difficult because the curve information retrieved by the curve information retrieving unit is insufficient, the control unit estimates a curve approaching mode on the basis of curve information provided before the curve information becomes insufficient. Therefore, a vehicle control operation is continued for the longest possible time even if curve information is not available from the curve information retrieving unit. Thus, the curve approaching mode controller is able to instruct the driver of a vehicle according to natural conditions and is easy to use.

According to the present invention, the control unit estimates the curve approaching mode in a predetermined time period or while the vehicle travels a predetermined distance when the curve information provided by the curve information retrieving unit is insufficient. Therefore, the execution of an improper control operation can be surely prevented while the vehicle is traveling a road where curve information is unavailable and the increase of errors in the accuracy of control can be avoided.

BRIEF DESCRIPTION OF THE DRAWINGS

The above and other objects, features and advantages of the present invention will become more apparent from the following description taken in connection with the accompanying drawings, in which:

FIG. 3 is a view of insufficient data provided by the navigation system shown in FIG. 1;

FIG. 4 is a diagrammatic view of assistance in explaining the relation between the position of a vehicle and nodes;

FIG. 5 is a diagrammatic view of assistance in explaining operations for calculating node angle and the radius of curvature of a curve.

DESCRIPTION OF THE PREFERRED EMBODIMENTS

A curve approaching mode controller in a preferred embodiment of the present invention will be described with reference to FIGS. 1 to 6.

Figure 1:
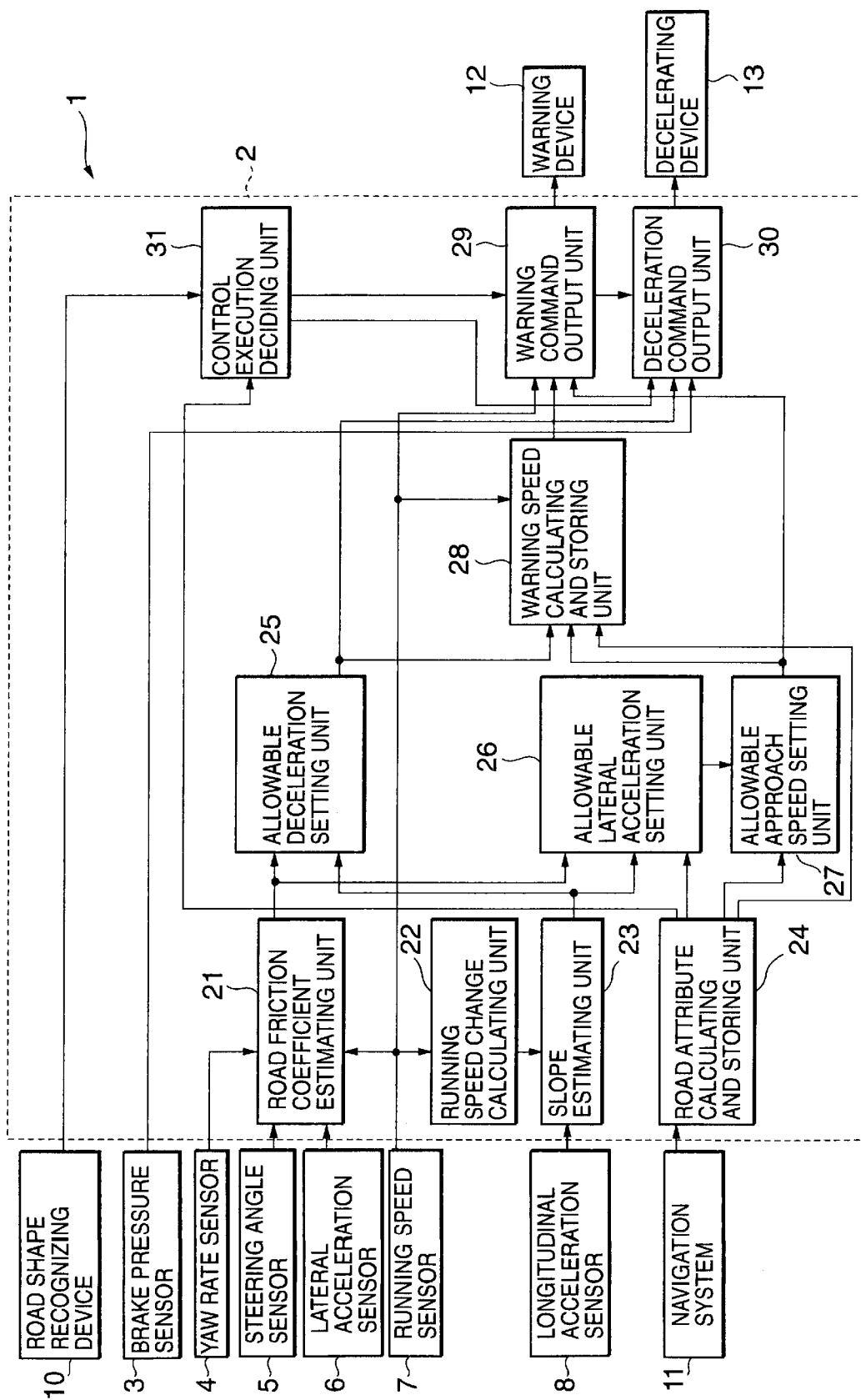
FIG. 1 is block diagram of a curve approaching mode controller in a preferred embodiment of the present invention.

Referring to FIG. 1, a curve approaching mode controller 1 has a control unit 2. Sensors including a brake pressure sensor 3, a yaw rate sensor 4, a steering angle sensor 5, a lateral acceleration sensor 6, a running speed sensor 7 and a longitudinal acceleration sensor 8 are connected to the control unit 2. The sensors 3, 4, 5, 6, 7 and 8 gives signals indicating a braking pressure, a yaw rate, a steering angle, a lateral acceleration, a running speed and a longitudinal acceleration, respectively, to the control unit 2.

A road shape recognizing device 10 is connected to the control unit 2 to give pictorial information about the form of a road stretching ahead of the vehicle to the control unit 2. The road shape recognizing device 10 includes, for example, a pair of CCD cameras. Stereoscopic images taken by the pair of CCD cameras are processed to recognize white lines on the road ahead, guard rails, roadside boundaries and the like. Distance to a position where a curve in a road ahead starts and the grade of the curve are determined. The class of a curve is selected from a large-radius rightward curve class, a middle-radius rightward curve class, a virtually straight road class, a middle-radius leftward curve class, a large-radius leftward curve class and such.

Figure 2:
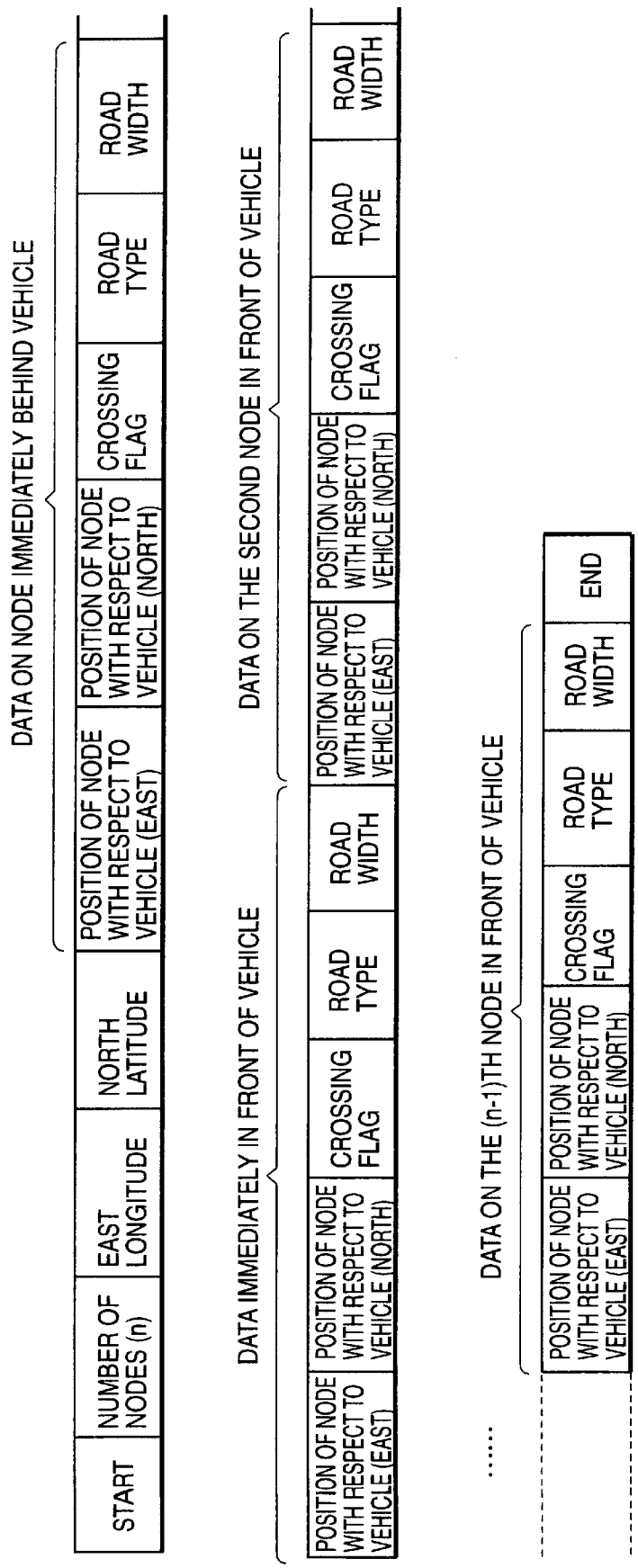
FIG. 2 is a view of normal data provided by a navigation system shown in FIG. 1.

A navigation system 11 is connected to the control unit 2. The navigation system 11 gives road data as shown in FIG. 2 to the control unit 2, for example, every 500 ms. The road data shown in FIG. 2 includes the number n of nodes on a traveling route of the vehicle, the east longitude of the vehicle, the north latitude of the vehicle, data on a node immediately behind the vehicle and data on nodes on the traveling route in a predetermined range ahead of the vehicle (data on the first node in front of the vehicle, data on the second node in front of the vehicle, . . . , and data on the (n−1)th node in front of the vehicle). As shown in FIG. 2, the data on each node includes information about a position to the east of the vehicle, a position to the north of the vehicle, a crossing flag indicating whether or not there is a crossing at the node, road type, road width and such.

When the vehicle is compelled to take a detour because the road is under construction or the vehicle short-cuts the road, the vehicle disappears from road map data stored in the navigation system 11. Consequently, the navigation system 11 is unable to provide the road data as shown in FIG. 2 on the road stretching ahead of the vehicle, and provides road data including only the east longitude and the north latitude of the vehicle as shown in FIG. 3. When the position of the vehicle goes out of the road map data stored in the navigation system 11 while the vehicle is running in the vicinity of a curve in the road or a crossing due to errors in the road map data or errors in the absolute position of the vehicle indicated by the GPS (global positioning system), the navigation system 11 is unable to provide road data on the road stretching ahead of the vehicle and provides the road data as shown in FIG. 3.

When data indicating a destination is entered by the crew member, such as the driver, the navigation system 11 selects an optimum route to the specified destination and gives, for example, data on nodes in a section of the route stretching 300 m ahead of the vehicle and data on a node immediately behind the vehicle as data on nodes on the route to the control unit 2. When any data indicating a destination is not given, the navigation system 11 presumes the order of priority of possible routes and selects the route of the highest priority as a probable route, and provides data on nodes in a section of the set probable route stretching 300 m ahead of the vehicle and data on a node immediately behind the vehicle as data on nodes on the probable route of the vehicle to the control unit 2.

The control unit 2 processes information provided by the sensors 3, 4, 5, 6, 7 and 8, the road form recognizing unit 10 and the navigation system 11 to see if the vehicle is able to travel safely a curve in the road stretching ahead of the vehicle. When necessary, the control unit 2 drives a warning device 12, such as a buzzer, an audio warning device or a warning lamp to warn the driver. When forced deceleration is necessary, the control unit 2 gives a deceleration command to a decelerating device 13 to decelerate the vehicle by shifting down the transmission of the vehicle, reducing the output torque of the engine of the vehicle or applying the brake system of the vehicle.

The navigation system 11 serves as a curve information retrieving unit.

The control unit 2 includes a road friction coefficient estimating unit 21, a running speed change calculating unit 22, a slope estimating unit 23, a road attribute calculating and storing unit 24, an allowable deceleration setting unit 25, an allowable lateral acceleration setting unit 26, an allowable approach speed setting unit 27, a warning speed calculating and storing unit 28, a warning command output unit 29, a deceleration command output unit 30 and a control execution deciding unit 31. The road friction coefficient estimating unit 21 determines an estimated road friction coefficient $\mu$ on the basis of a yaw rate provided by the yaw rate sensor 4, a steering angle provided by the steering angle sensor 5, a lateral acceleration provided by the lateral acceleration sensor 6 and a running speed provided by the running speed sensor 7, and gives the estimated road friction coefficient $\mu$ to the allowable deceleration setting unit 25 and the allowable lateral acceleration setting unit 26. The road friction coefficient estimating unit 21 may estimate the road friction coefficient $\mu$ by, for example, a calculating method, which uses adaptive control for estimating the road friction coefficient $\mu$, proposed by the inventors of the present invention in JP-A No. 8-2274.

The running speed change calculating unit 22 calculates a running speed change rate every set time and gives a calculated running speed change rate to the slope estimating unit 23.

The slope estimating unit 23 determines an estimated slope SL of the road on the basis of a longitudinal acceleration provided by the longitudinal acceleration sensor 8 and a running speed change rate provided by the running speed change calculating unit 22 and gives the estimated slope SL to the allowable deceleration setting unit 25 and the allowable lateral acceleration setting unit 26. The estimated slope SL may be determined by a method proposed by the inventors of the present invention in JP-A No. 11-83501.

The road attribute calculating and storing unit 24 calculates a distance from the preceding node, a radius of curvature of a curve and a node angle for each node on the basis of information about the position of the node provided by the navigation system 11 and stores the calculated values together with information about crossing identification, road type, road width and singular point identification. More concretely, the road attribute calculating and storing unit 24 calculates the distance between a node and the preceding node for each node plotted on a node coordinate system having its origin at the position of the vehicle by using the coordinates of the nodes (FIG. 4) and Expression (1):

$$Lp[j] = \{(xp[j]-xp[j-1])^2 + (yp[j]-yp[j-1])^2\}^{1/2} \quad (1),$$

where (xp[j], yp[j]) are the coordinates of a node Pj, (xp[j-1], yp[j-1]) are the coordinates of the preceding node Pj-1 and $1 \leq j \leq n-1$.

As shown in FIG. 5, the road attribute calculating and storing unit 24 calculates the node angle tp[j] of each node Pj by substituting coordinates of nodes into Expression (2).

$$tp[j] = \quad (2)$$
$$\sin^{-1}\{((xp[j-1]-xp[j]) \cdot (yp[j]-yp[j+1]) - (xp[j]-xp[j+1]) \cdot$$
$$(yp[j-1]-yp[j]))/(Lp[j] \cdot Lp[j+1])\},$$

where a node angle tp[j] calculated by using Expression (2) is positive for a rightward curve and is negative for a leftward curve.

The road attribute calculating and storing unit 24 calculates the radius rp[j] of curvature of a node Pj by using Expression (3):

$$rp[j] = \min(Lp[j], Lp[j+1])/2/\tan(|tp[j]|/2) \quad (3),$$

where min(Lp[j], Lp[j+1]) signifies the selection of a smaller one of Lp[j] and Lp[j+1]. In FIG. 5, Lp[j]<Lp[j+1] and hence min(Lp[j], Lp[j+1])=Lp[j].

The road attribute calculating and storing unit 24 executes node type identification (whether or not the node is a crossing, or whether or not the node is a crossing on the route), road type identification (superhighway, urban highway, general national highway, local highway, etc.), and road width setting, by using data provided by the navigation system 11.

The road attribute calculating and storing unit 24 decides whether or not the node is a singular point on the basis of the data provided by the navigation system 11. If the node Pj is a singular point, the road attribute calculating and storing unit 24 calculates node angle tp[j+1] and radius rp[j+1] of curvature of a curve between the preceding node Pj-1 and the succeeding node Pj+1.

If the distance between the adjacent nodes is excessively short, a calculated radius of curvature is smaller than the actual radius of curvature of the road and, consequently, an unnecessary warning is given or an unnecessary deceleration control operation is executed. To prevent such an unnecessary operation, the road attribute calculating and storing unit 24 examines a road type attribute cp[j] and a road width attribute wp[j] and excludes such a node as a singular point when calculating node angle and radius of curvature of a curve on the basis of a node interval Lp[j] and a node angle tp[j]. Generally, the road attribute calculating and storing unit 24 updates the information about the nodes on the basis of new data on the nodes as shown in FIG. 2 received periodically from the navigation system 11.

As mentioned above, when the position of the vehicle disappears temporarily from the road map data stored in the navigation system 11 and only the insufficient node information as shown in FIG. 3 is available from the navigation system 11, the road attribute calculating and storing unit 24 stores the normal node information received immediately before receiving the insufficient information without updating the same, and informs the warning speed calculating and storing unit 28 of a fact that the node information is insufficient.

The road attribute calculating and storing unit 24 counts time for which the insufficient information is received from the navigation system 11 and a distance traveled in that time. If the time exceeds a predetermined time, such as 10 s, or if the distance exceeds a predetermined distance, such as 100 m, the road attribute calculating and storing unit 24 provides a signal to stop the control operation of the curve approaching mode controller 1.

The allowable deceleration setting unit 25 sets an allowable deceleration $Xg_{Lim}$ at which the vehicle can be safely decelerated on the basis of the road friction coefficient $\mu$ provided by the road friction coefficient estimating unit 21 and the slope SL provided by the slope estimating unit 23. More concretely, as mentioned in the description of the invention proposed by the inventors of the present invention in JP-A No. 11-83501, a reference deceleration $Xg_{Lim0}$ is determined on the basis of the estimated road friction coefficient $\mu$ and the allowable deceleration $Xg_{Lim}$ is determined by correcting the reference deceleration $Xg_{Lim0}$ by using the slope SL. The thus set allowable deceleration $Xg_{Lim}$ is given to the warning speed calculating and storing unit 28 and the deceleration command output unit 30.

The allowable lateral acceleration setting unit 26 calculates a reference lateral acceleration ayl1 according to the road friction coefficient $\mu$, and corrects the reference lateral acceleration ayl1 by using the slope SL to set an allowable lateral acceleration ayl2. The allowable lateral acceleration setting unit 26 corrects the allowable lateral acceleration ayl2 according to $(ayl1/rp[j])^{1/2}$ to set a final allowable lateral acceleration ayl and gives the set allowable lateral acceleration ayl to the allowable approach speed setting unit 27.

The reference lateral acceleration ayl1 can be determined by using Expression (4) mentioned in the description of an invention proposed by the inventors of the present invention in JP-A No. 11-83501:

$$ayl1 = \mu \cdot K\mu \cdot g \quad (4),$$

where $K\mu$ is safety factor and g is the gravitational acceleration.

The allowable lateral acceleration ayl2 can be calculated by using, for example, Expression (5):

$$ayl2 = \{(ayl1)^2 - (g \cdot SL/100)^2\}^{1/2} \quad (5).$$

The final allowable lateral acceleration ayl can be calculated by using, for example, Expression (6):

$$ayl = ayl2 \cdot Kv \quad (6).$$

where Kv is a running speed correction factor. The running speed correction factor Kv has a smaller value for a greater limit curve approach speed. To enhance safety in high-speed cornering, correction is made so that the allowable lateral acceleration ayl decreases as the limit curve approach speed increases.

The allowable approach speed setting unit 27 calculates an allowable approach speed vap for each node on the basis of node attribute information stored in the road attribute calculating and storing unit 24 and the allowable lateral acceleration ayl set by the allowable lateral acceleration setting unit 26 and gives the allowable approach speed vap to the warning speed calculating and storing unit 28 and the warning command output unit 29.

The allowable approach speed setting unit 27 calculates a reference approach speed vap0[j] for a node Pj by using the allowable lateral acceleration ayl, the radius rp[j] of curvature of the curve and Expression (7):

$$vap0[j]=(ayl \cdot rp[j])^{1/2} \quad (7).$$

The allowable approach speed setting unit 27 decides whether or not the adjacent nodes are included in a curve on the basis of the node interval Lp [j] and the signs of the node angles tp[j−1] and tp[j].

The allowable approach speed setting unit 27 determines a curve sharpness tpa at each node, which is determined by adding a node angle preceding each of a plurality of nodes included in the same curve, and corrects the reference approach speed vap0 for each node by using the curve sharpness tpa to determine the allowable approach speed vap1. If one node Pj has one independent curve, the curve sharpness tpa[j]=tp[j]. The allowable approach speed vap1 can be calculated by using, for example, Expression (8):

$$vap1=vap0 \cdot Kt \quad (8).$$

where it is a curve sharpness correction factor. The curve sharpness correction factor has a smaller value for a greater curve sharpness tpa to decrease the allowable approach speed as the curve sharpness tpa increases because cornering along a curve of a higher curve sharpness tpa is more difficult.

The allowable approach speed setting unit 27 corrects the allowable approach speed vap1 further to determine an allowable approach speed vap2 to avoid excessively decreasing allowable approach speed when a curve at each node is a tight one having a radius rp[j] of curvature not greater than a predetermined ratio rwk of the road width wp [j]. The allowable approach speed vap2 is determined by comparing a predetermined value $(ayl \cdot wk \cdot rwk)^{1/2}$ and the allowable approach speed vap1 and selecting the greater one of the predetermined value $(ayl \cdot wk \cdot rwk)^{1/2}$ and the allowable approach speed vap1. The allowable approach speed vap2 is thus determined by using Expression (9):

$$vap2=\max(vap1, (aly \cdot wk \cdot rwk)^{1/2}) \quad (9).$$

The allowable approach speed setting unit 27 executes a smooth process to adjust the dispersion of the allowable approach speeds vap2 for a plurality of nodes forming the same curve to determine a final allowable approach speed vap for each node. More concretely, the allowable approach speed setting unit 27 compares the allowable approach speed vap2[j] for the object node Pj, the mean of the allowable approach speed vap2[j] for the object node Pj and the allowable approach speed vap2[j+1] for the succeeding node Pj+1, and the mean of the allowable approach speed vap2[j] and the allowable approach speed vap2[j−1] for the preceding node Pj−1, and the median of the set of those values as the final allowable approach speed vap for the node Pj.

The warning speed calculating and storing unit 28 calculates warning speeds vw[j], i.e., threshold speeds above which a warning is given, by using the node intervals Lp[j], allowable decelerations $Xg_{Lim}$ and allowable approach speeds vap[j] for all the n nodes provided by the navigation system 11 excluding a node P0 by which the vehicle has just passed, the farthest node Pn−1 and singular nodes.

The warning speed vw[j] is determined so that the running speed of the vehicle coincides with the allowable approach speed vap[j] when the vehicle is decelerated at a deceleration equal to, for example, 50% of the allowable deceleration $Xg_{Lim}$ while the vehicle is running from the present position to the node Pj. The warning speed vw[j] can be calculated by using Expression (10):

$$vw[j]=\{vap[j]^2+2 \cdot (0.5 \cdot Xg_{Lim})LL[j]\}^{1/2} \quad (10).$$

where LL[j] is the distance along the route from the present position to the node Pj and can be calculated by using Expressions (11) and (12) when the navigation system 11 provides the normal node information as shown in FIG. 2:

When j=1, $$LL[1]=(xp[1]^2+yp[1]^2)^{1/2} \quad (11);$$

when $2 \leq j \leq n-1$, $$LL[j]=LL[1]+Lp[2]+Lp[3]+\ldots+Lp[j] \quad (12).$$

When only the insufficient node information as shown in FIG. 3 is provided by the navigation system 11, the LL[j] can be calculated on the basis of the normal node information obtained immediately before a state where the insufficient node information is provided, taking a distance traveled by the vehicle (=(running speed v)×(calculation cycle time Δt)) after the creation of the state where the insufficient node information is provided by using Expressions (13) and (14):

When j=1, $$LL[1]=(xp[1]^2+yp[1]^2)^{1/2}-v \cdot \Delta t \quad (13);$$

When $2 \leq j \leq n-1$, $$LL[j]=LL[1]+Lp[2]+Lp[3]+\ldots+Lp[j] \quad (14).$$

Figure 6:
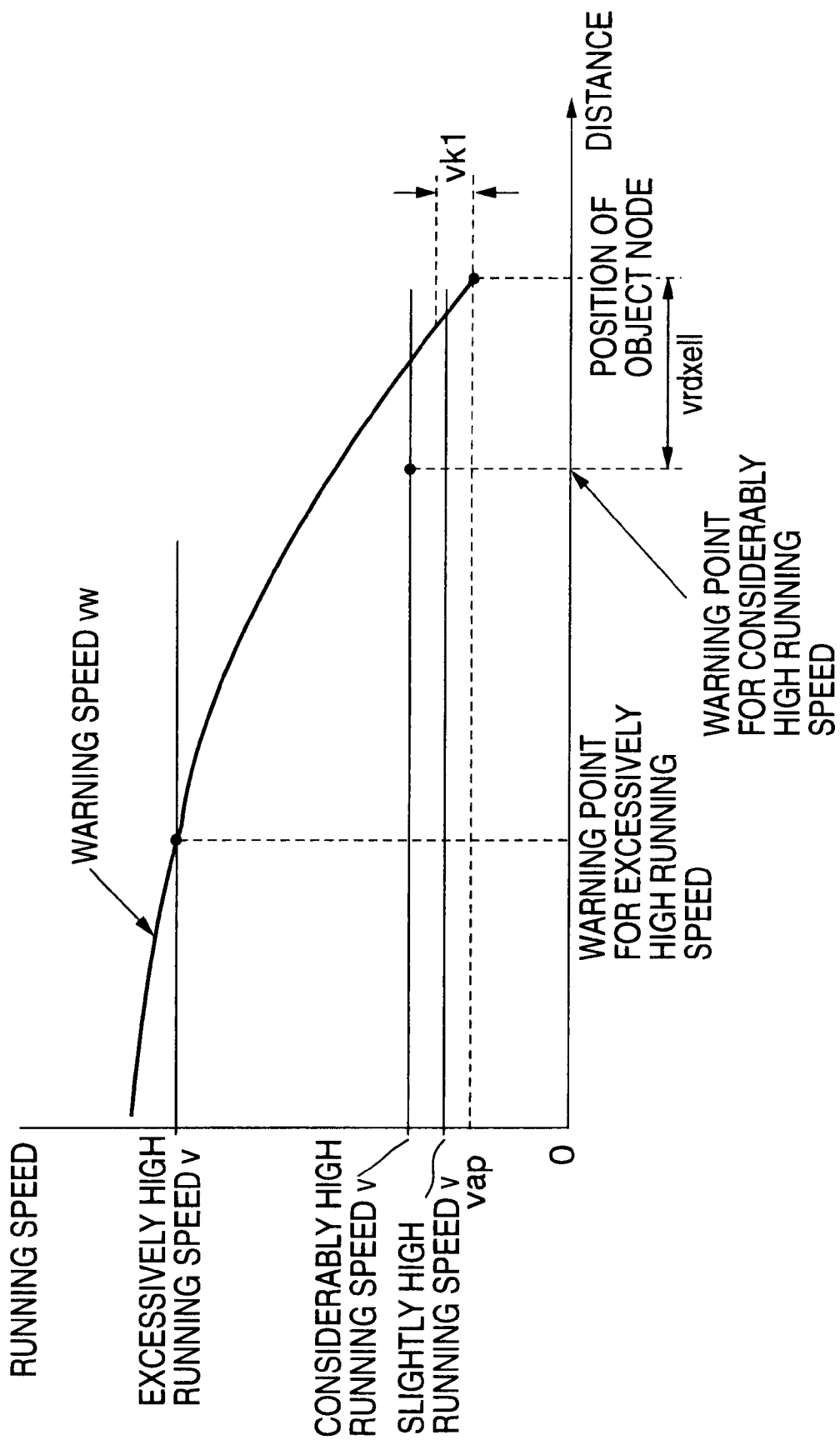
FIG. 6 is a graph showing the relation between distance to a desired node and a warning speed.

The warning command output unit 29 decides whether warning must be given on the basis of the running speed v measured by the running speed sensor 7, the allowable approach speed vap[j] set for the nodes by the allowable approach speed setting unit 27 and the warning speeds vw[j] for the nodes calculated by the warning speed calculating and storing unit 28. When the warning command output unit 29 decides that a warning should be given and a signal requesting the execution of a warning control operation is given by the control execution deciding unit 31 to the warning command output unit 29, the warning command output unit 29 gives a control signal to the warning device 12 to warn the driver. More concretely, the warning command output unit 29 selects a node for which the value of the warning speed vw[j] is a minimum as an object node for warning, compares the warning speed vw for the object node and the running speed v measured by the running speed sensor 7. If the running speed v is higher than the warning speed vw for the node, and the difference between the allowable approach speed vap for the object node and the running speed v of the vehicle is not smaller than a predetermined value of vk1, for example, 5 km/h as shown in FIG. 6, it is decided that the running speed of the vehicle is excessively high and a warning should be given (for example, a warning point for a state where the running speed is excessively high in FIG. 6). When the difference between the running speed v of the vehicle and the allowable approach speed vap for the object node is not smaller than a predetermined value vk1, the running speed y is below the warning speed vw for the node and the distance LL to the object node is not greater than a predetermined value vrdxell, it is decided that the running speed of the vehicle is considerably high and a warning should be given. The predetermined value vrdxell is a function of the running speed that increases as the running speed increases. For example, vrdxell=2 v (=driving distance until brake force works in two seconds).

The deceleration command output unit 30 decides whether further effective deceleration is necessary for the object node for which the warning command output unit 29 decided that a warning should be given. If the driver does not perform any proper decelerating operation in a predetermined time of, for example, 2 s after the warning command output unit 29 has decided that a warning should be given for the object node, the deceleration command output unit 30 decides that deceleration must be made for the object node. When the deceleration command output unit 30 decides that deceleration must be made for the object node and a decelerating control operation request signal is given by the control execution deciding unit 31 to the deceleration command output unit 30, the deceleration command output unit 30 gives a control signal to the decelerating device 13 to execute a deceleration control operation.

The control execution deciding unit 31 decides whether a control operation should be executed for the object node for which the warning command output unit 29 decided that a warning should be given or for which the deceleration command output unit 30 decided that a decelerating control operation should be executed. First, it is decided whether the object node for which a decision is made that a warning should be given exists actually on the road. The radius rp of curvature of the object node is read from the road attribute data stored in the road attribute calculating and storing unit 24, the distance LL to the object node is read from the data stored in the warning speed calculating and storing unit 28. The radius rp of curvature and the distance LL are compared with data on the condition and the starting point of a curve in the road stretching ahead. If the radius rp of curvature and the distance LL coincide with the data, it is decided that the object node exists actually on the road and permission to give warning and to execute the decelerating control operation for the object node is given. If the radius rp of curvature and the distance LL do not coincide with the data, it is considered that the road information included in maps stored in a CD-ROM included in the navigation system 11 is different from actual road conditions due to the construction of new roads and the repair of the road and the permission to give a warning and to execute the decelerating control operation for the object node is cancelled.

When the control execution deciding unit 31 gives permission to give a warning and to execute a decelerating control operation for the object node, the warning command output unit 29 gives the warning device 12 a warning command signal to warn the driver of approach to a curve. When necessary, the deceleration command output unit 30 gives the decelerating device 13 a deceleration command signal. Then, the decelerating device 13 shifts down the transmission, reduces the output torque of the engine and/or applies the brake for forced deceleration.

Thus, the navigation system 11 functions as a curve information retrieving unit and the control unit 2 functions as a curve approaching mode deciding and controlling unit. When only insufficient curve information is available from the navigation system 11 and it is difficult to estimate a curve approaching mode in which the vehicle will approaches a curve in the road ahead, the curve approaching mode is estimated on the basis of curve information provided before the insufficient curve information is provided by the navigation system 11. Therefore, the control of the running operation of the vehicle can be continued for the longest possible time even in a state where curve information is unavailable from the navigation system 11. Consequently, a warning operation and a deceleration control operation are not interrupted and the same can be continued. Thus, the curve approaching mode controller is capable of instructing the driver of the vehicle according to natural conditions and of being easily used. Since data is held for control for the longest possible time, data processing load is small and unnecessary time loss in processing data can be prevented.

The curve approaching mode controller 1 interrupts its control operation when the duration of a state where only insufficient curve information is available from the navigation system 11 exceeds a predetermined time or a time in which the vehicle travels a predetermined distance. Therefore, an inappropriate warning operation and an inappropriate deceleration control operation can be surely prevented when the vehicle enters a road that cannot be found in the road map data stored in the navigation system 11, such as a private road or a large parking lot.

The curve information retrieving unit does not need to be limited to the navigation system 11. If curve information can be obtained by means of a radar or a camera, the radar or the camera may be used as the curve information retrieving unit. Curve information may be retrieved from information provided by the ITS (the intelligent transportation system).

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. A curve approaching mode controller comprising:
    a curve information retrieving unit for retrieving curve information about a curve in a road stretching ahead of a vehicle; and
    a control unit for estimating a curve approaching mode in which the vehicle will approach the curve on the basis of the curve information retrieved by the curve information retrieving unit and executing predetermined control operations;
    wherein the control unit estimates, when the curve information retrieved by the curve information retrieving unit is insufficient for curve approaching mode estimation, a curve approaching mode in which the vehicle will approach the curve on the basis of curve information provided before the curve information becomes insufficient.

2. The curve approaching mode controller according to claim 1, wherein the control unit completes a curve approaching mode estimating operation in a predetermined time period when the curve information is insufficient.

3. The curve approaching mode controller according to claim 1, wherein the control unit completes a curve approaching mode estimating operation while the vehicle travels a predetermined distance when the curve information is insufficient.

4. The curve approaching mode controller according to claim 1, wherein the control unit includes a storage unit for storing the curve information provided by the curve information retrieving unit, and a warning speed calculating unit for calculating a warning speed as a reference data for the curve approaching mode estimating operation on the basis of the curve information stored in the storage unit; the storage unit holds the stored curve information without updating the same when the curve information retrieving unit provides insufficient curve information insufficient for a curve approaching mode estimation, and gives notice that the insufficient curve information is provided to the warning speed calculating unit; and the warning speed calculating unit calculates the warning speed upon the reception of the notice on the basis of the curve information previously stored in the storage unit.

5. The curve approaching mode controller according to claim 4, wherein the control unit further includes a warning command output unit for deciding whether a warning should be given on the basis of a running speed at which the vehicle is running at present and a warning speed calculated by the warning speed calculating unit, and giving a control signal to a warning device according to the result of decision.

6. The curve approaching mode controller according to claim 4, wherein the control unit further includes a deceleration command output unit for deciding whether forced deceleration is necessary on the basis of a running speed at which the vehicle is running at present and a warning speed calculated by the warning speed calculating unit, and giving a control signal to a decelerating device according to the result of decision.

7. The curve approaching mode controller according to claim 4, wherein the control unit further includes: a warning command output unit for deciding whether a warning should be given on the basis of a running speed at which the vehicle is running at present and a warning speed calculated by the warning speed calculating unit, and giving a control signal according to the result of decision to a warning device and a deceleration command output unit for monitoring operations of the vehicle after the warning command output unit has decided that a warning should be given, and giving a control signal to a decelerating device when the driver does not execute a proper decelerating operation in a predetermined time.

8. The curve approaching mode controller according to claim 5, further comprising a road shape recognizing device for recognizing a shape of the road stretching ahead of the vehicle on the basis of image information about the road;
wherein the control unit decides whether a curve corresponding to the curve information exists actually on the road on the basis of the result of a road shape recognizing operation of the road shape recognizing device, and controls the warning command output unit according to the result of decision.

9. The curve approaching mode controller according to claim 7, further comprising a road shape recognizing device for recognizing a shape of the road stretching ahead of the vehicle on the basis of image information about the road;
wherein the control unit decides whether a curve corresponding to the curve information exists actually on the road on the basis of the result of a road shape recognizing operation of the road shape recognizing device, and controls the warning command output unit according to the result of decision.

10. The curve approaching mode controller according to claim 6, further comprising a road shape recognizing device for recognizing a shape of the road stretching ahead of the vehicle on the basis of image information about the road;
wherein the control unit decides whether a curve corresponding to the curve information exists actually on the road on the basis of the result of a road shape recognizing operation of the road shape recognizing device, and controls the decelerating command output unit according to the result of decision.

11. The curve approaching mode controller according to claim 7, further comprising a road shape recognizing device for recognizing a shape of the road stretching ahead of the vehicle on the basis of image information about the road;
wherein the control unit decides whether a curve corresponding to the curve information exists actually on the road on the basis of the result of a road shape recognizing operation of the road shape recognizing device, and controls the decelerating command output unit according to the result of decision.

12. The curve approaching mode controller according to claim 1, wherein the curve information retrieving unit is a navigation system holding road map data.

\* \* \* \* \*